United States Patent
Gamwell et al.

(10) Patent No.: US 10,767,100 B2
(45) Date of Patent: Sep. 8, 2020

(54) COMPATIBILIZED RESIN-CEMENT COMPOSITE COMPOSITIONS

(71) Applicant: Halliburton Energy Services, Inc., Houston, TX (US)

(72) Inventors: Chase Russell Gamwell, Spring, TX (US); Samuel Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 444 days.

(21) Appl. No.: 15/506,209

(22) PCT Filed: Sep. 24, 2014

(86) PCT No.: PCT/US2014/057246
§ 371 (c)(1),
(2) Date: Feb. 23, 2017

(87) PCT Pub. No.: WO2016/048303
PCT Pub. Date: Mar. 31, 2016

(65) Prior Publication Data
US 2018/0215988 A1 Aug. 2, 2018

(51) Int. Cl.
C09K 8/467 (2006.01)
E21B 33/13 (2006.01)
C04B 28/02 (2006.01)
C08L 79/02 (2006.01)

(52) U.S. Cl.
CPC .............. *C09K 8/467* (2013.01); *C04B 28/02* (2013.01); *C08L 79/02* (2013.01); *E21B 33/13* (2013.01); *C09K 2208/08* (2013.01); *C09K 2208/24* (2013.01); *C09K 2208/26* (2013.01); *C09K 2208/32* (2013.01); *Y02W 30/92* (2015.05)

(58) Field of Classification Search
CPC ................................ C09K 8/467; E21B 33/13
USPC ........................................................ 166/293
See application file for complete search history.

(56) References Cited

U.S. PATENT DOCUMENTS

| | | | |
|---|---|---|---|
| 5,162,060 A | 11/1992 | Bredow et al. | |
| 5,624,980 A * | 4/1997 | Kobori | ..................... C04B 26/02 524/448 |
| 7,650,940 B2 | 1/2010 | Reddy et al. | |
| 8,695,705 B2 | 4/2014 | Miller et al. | |
| 2001/0009133 A1* | 7/2001 | Chatterji | ................. C04B 24/18 106/724 |

FOREIGN PATENT DOCUMENTS

WO 2012103338 8/2012

OTHER PUBLICATIONS

International Search Report and Written Opinion of PCT Application No. PCT/US2014/057246 dated Jun. 22, 2015: pp. 1-22.

* cited by examiner

*Primary Examiner* — Zakiya W Bates
*Assistant Examiner* — Ashish K Varma
(74) *Attorney, Agent, or Firm* — Chamberlain Hrdlicka

(57) ABSTRACT

Various embodiments disclosed relate to compatibilized resin-cement composite compositions and methods of using the same. In various embodiments, the present invention provides a method of treating a subterranean formation that includes placing in the subterranean formation a resin-cement composite composition. The resin-cement composite composition includes a resin, a cement, and a substituted or unsubstituted poly(alkylamine) compatibilizer.

17 Claims, 7 Drawing Sheets

500μm

COMPATIBILIZED RESIN-CEMENT COMPOSITE COMPOSITIONS

BACKGROUND

Cement and resin are both used as separate and discrete systems in the oilfield. In some cases, it is desirable to mix these systems together to form a composite material in a mixture that exhibits advantageous qualities from both systems. Unfortunately, cement and resin are generally incompatible with one another and have a tendency to phase-separate after being mixed, an effect that is more pronounced at higher concentrations.

BRIEF DESCRIPTION OF THE FIGURES

The drawings, which are not necessarily drawn to scale, illustrate generally, by way of example, but not by way of limitation, various embodiments discussed in the present document.

DETAILED DESCRIPTION OF THE INVENTION

Figure 1:
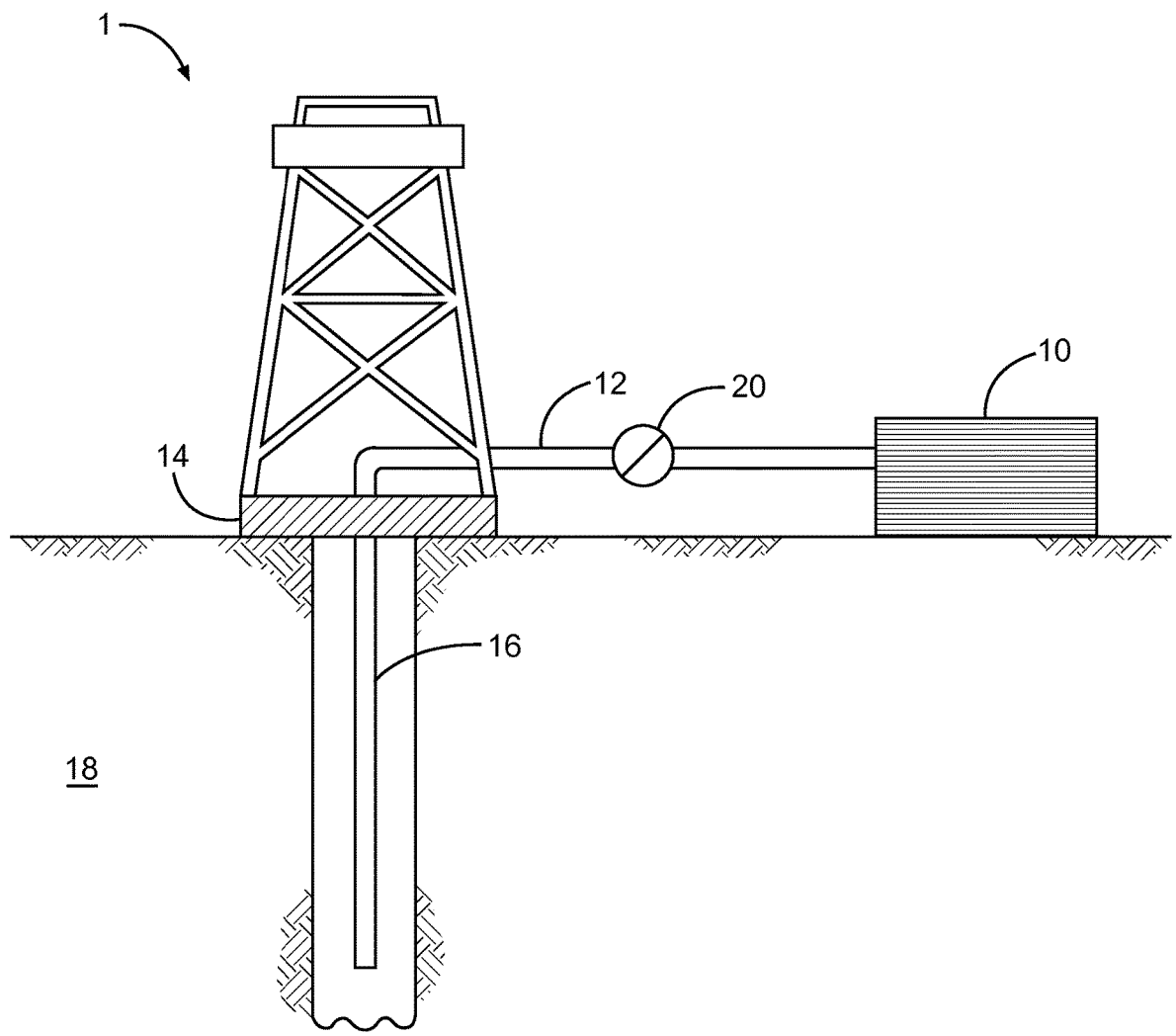
FIG. 1 illustrates a system or apparatus for delivering a composition to a subterranean formation, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include $OR$, $OOR$, $OC(O)N(R)_2$, $CN$, $CF_3$, $OCF_3$, $R$, $C(O)$, methylenedioxy, ethylenedioxy, $N(R)_2$, $SR$, $SOR$, $SO_2R$, $SO_2N(R)_2$, $SO_3R$, $C(O)R$, $C(O)C(O)R$, $C(O)CH_2C$ (O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing three or more ring members, of which one or more is a heteroatom such as, but not limited to, N, O, and S.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different repeating units. A copolymer can include any suitable number of repeating units.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packer fluid" refers to fluids or slurries that can be placed in the annular region of a well between tubing and outer casing above a packer. In various examples, the packer fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, and a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition, or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

Various embodiments of the present invention provide a method of treating a subterranean formation. The method includes placing in a subterranean formation a resin-cement composite composition. The resin-cement composite composition includes a resin, a cement, and a substituted or unsubstituted poly(alkylamine) compatibilizer.

Various embodiments of the present invention provide a method of treating a subterranean formation including placing in the subterranean formation resin-cement composite composition including about 20 wt % to about 80 wt % of a curable epoxide resin, about 20 wt % to about 80 wt % of a cement, and about 1 wt % to about 15 wt % of a polyethyleneimine compatibilizer.

Various embodiments of the present invention provide a system including a resin-cement composite composition that includes a resin, a cement, and a substituted or unsubstituted poly(alkylamine) compatibilizer. The system also includes a subterranean formation comprising the composition therein.

Various embodiments of the present invention provide a resin-cement composite composition for treatment of a subterranean formation. The composition includes a resin, a cement, and a substituted or unsubstituted poly(alkylamine) compatibilizer.

Various embodiments of the present invention provide a resin-cement composite composition for treatment of a subterranean formation. The composition includes about 20 wt % to about 80 wt % of a curable epoxide resin, about 20 wt % to about 80 wt % of a cement, and about 1 wt % to about 15 wt % of a polyethyleneimine compatibilizer.

Various embodiments of the present invention provide a method of preparing a composition for treatment of a subterranean formation. The method includes forming a composition that includes a resin, a cement, and a substituted or unsubstituted poly(alkylamine) compatibilizer.

Various embodiments of the present invention have certain advantages over other resin compositions, cement compositions, compatibilizers, combinations thereof, and methods of using the same, at least some of which are unexpected. For example, in some embodiments, unlike other mixtures of resin and cement, the cement-resin composite forms a stable mixture of resin and cement that is resistant to phase separation. In various embodiments, the stable mixture of resin and cement can provide a composite that is less expensive than resin, but that retains various advantageous qualities of resin. In various embodiments, the stable mixture of resin and cement can have unique properties not present in a cement composition or a resin composition alone. In various embodiments, the stable mixture of resin and cement can be used in a greater variety of wellbore conditions than a cement composition or a resin composition alone.

Method of Treating a Subterranean Formation.

In various embodiments, the present invention provides a method of treating a subterranean formation. The method can including placing in a subterranean formation a resin-cement composite composition. The resin-cement composite composition can be a curable composition. The placing of the resin-cement composite composition in the subterranean formation can include contacting the resin-cement composite composition and a subterranean material, such as any suitable subterranean material. The subterranean formation can be any suitable subterranean formation. The resin-cement composite composition includes a resin (e.g., a curable resin), a cement, and a substituted or unsubstituted poly(alkylamine) compatibilizer. The resin and the cement can be substantially evenly mixed, such that the resin and the cement are approximately evenly distributed throughout the resin-cement composite. The compatibilizer allows the resin and the cement to avoid or resist phase separation, for example, such that a stable mixture of the resin and the cement occurs with substantially no settling at room temperature or at a downhole temperature without significant stirring or agitation for about 1 hour, 2 hours, 3, 4, 5, 6, 8, 10, 12, 14, 16, 18, 20, 22 hours, 1 day, 1.5, 2, 3, 4, 5, 6 days, 1 week, 1.5, 2, 3 weeks, or about 1 month or more.

In some embodiments, the present invention provides a method of treating a subterranean formation. The method includes placing the resin-cement composite composition in a subterranean formation. The placing of the resin-cement composite composition in the subterranean formation can include contacting the resin-cement composite composition and any suitable part of the subterranean formation, or contacting the resin-cement composite composition and a subterranean material, such as any suitable subterranean material. The subterranean formation can be any suitable subterranean formation. In some examples, the placing of the composition in the subterranean formation includes contacting the composition with or placing the composition in at least one of a fracture, at least a part of an area surrounding a fracture, a flow pathway, or an area surrounding the same. The placing of the resin-cement composite composition in the subterranean formation can be any suitable placing and can include any suitable contacting between the subterranean formation and the resin-cement composite composition. In some embodiments, the method includes obtaining or providing the resin-cement composite composition, such as by mixing one or more of the components of the resin-cement composition together. The obtaining or providing of the composition can occur at any suitable time and at any suitable location. The obtaining or providing of the composition can occur at least partially above the surface. The obtaining or providing of the composition can occur at least partially in the subterranean formation (e.g., downhole).

In various embodiments, the method includes cementing or repairing a wellbore in the subterranean formation. For example, the resin-cement composite composition can be placed into an annulus between a casing and the wellbore, or between two casings, and can then be cured. In some examples, the method can include placing the cement-resin composite composition into a damaged region of a wellbore and then curing the cement-resin composite composition.

In various embodiments, the method includes consolidating particulates downhole. For example, the method can include placing the resin-cement composite composition into a region of the subterranean formation that includes fines, gravel, or other particles, and allowing the resin-cement composite composition to cure such that the particles are substantially fixed in-place. In various embodiments, the method can include lost-circulation management, such as by placing the resin-cement composite in a subterranean region experiencing fluid loss and curing the composition.

The method can include hydraulic fracturing, such as a method of hydraulic fracturing to generate a fracture or flow pathway. The placing of the resin-cement composite composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the resin-cement composite composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the resin-cement composite composition is placed or contacted, or the resin-cement composite composition is placed or contacted to an area surrounding the generated fracture or flow pathway.

In various embodiments, the method includes curing the composition, to provide a cured product of the resin-cement composite composition. The curing of the resin-cement composite composition can occur at least partially above-surface, such that a partial curing occurs prior to placing the composition in the subterranean formation. The curing of the resin-cement composite composition can occur at least partially in the subterranean formation, such that all or part of the curing occurs when the composition is downhole, such as when the composition is at a desired location downhole.

Curing can occur for any suitable time, at any suitable temperature, and at any suitable pressure, such as temperatures and pressures experienced downhole. Curing can include polymerization or crosslinking of the resin. Curing can include hardening of the cement. Curing can occur for 10 minutes, 20, 30, 40, 50 minutes, 1 hour, 1.5, 2, 3, 4, 5, 6, 8, 10, 12, 14, 16, 18, 20, 22 hours, 1 day, 1.5, 2, 3, 4, 5, 6 days, 1 week, 1.5, 2, 3 weeks, or about 1 month or more. Curing can occur at about 0° C. to about 500° C., or about 20° C. to about 400° C., or about 0° C. or less, or about 10° C., 20, 25, 30, 35, 40, 45, 50, 60, 70, 80, 90, 100, 125, 150, 175, 200, 225, 250, 275, 300, 350, 400, 450, or about 500° C. or more.

The cured resin-cement composite composition can have any suitable tensile strength, such as about 115 psi to about 10,000 psi, about 200 psi to about 800 psi, or about 115 psi or less, or about 120 psi, 125, 130, 140, 150, 160, 170, 180, 190, 200, 225, 250, 275, 300, 350, 400, 450, 500, 600, 700, 800, 900, 1,000, 1,500, 2,000, 2,500, 5,000, 7,500, or about 10,000 psi or more.

The cured resin-cement composite composition can have any suitable compressive strength, such as about 300 psi to about 10,000 psi, about 1,000 psi to about 3,000 psi, or about 300 psi or less, or about 400, 450, 500, 600, 700, 800, 900, 1,000, 1,500, 2,000, 2,500, 3,000, 5,000, 7,500, or about 10,000 psi or more Compatibilizer.

The cement-resin composite composition includes a compatibilizer. The compatibilizer helps the resin and cement resist or avoid phase separation. The compatibilizer can be present as any suitable proportion of the resin-cement composite composition, so long as the cement and the resin resist or avoid phase separation, such as 0.1 wt % to about 30 wt % of the resin-cement composite composition, about 1 wt % to about 15 wt %, or about 0.1 wt % or less, or about 0.5 wt %, 1, 2, 3, 4, 5, 6, 7, 8, 9, 10, 11, 12, 13, 14, 15, 16, 18, 20, 22, 24, 26, 28, or about 30 wt % or more.

The compatibilizer is a substituted or unsubstituted poly(alkylamine). The poly(alkylamine) can be a branched or linear polymer or polyamine. The poly(alkylamine) can have the following structure:

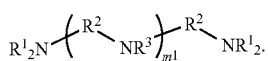

The poly(alkylamine) can be polyethyleneimine. The poly(alkylamine) can be optionally hydrophobically- or hydrophilically modified, or can be unmodified. The poly(alkylamine) can be water-soluble. Embodiments are not restricted to any particular mechanism of operation; in various embodiments, the poly(alkylamine) can bind to both the cement and the resin to avoid or resist phase separation of the cement and resin.

At each occurrence, $R^1$ can be selected from the group consisting of —H and a substituted or unsubstituted ($C_1$-$C_{30}$)hydrocarbyl. At each occurrence, $R^1$ can be selected from the group consisting of —H and a substituted or unsubstituted ($C_1$-$C_{30}$)alkyl. At each occurrence, $R^1$ can be selected from the group consisting of —H and a ($C_1$-$C_{30}$) alkyl.

At each occurrence, $R^2$ can be a substituted or unsubstituted ($C_1$-$C_{30}$)hydrocarbylene. At each occurrence, $R^2$ can be ($C_1$-$C_{20}$)alkylene. At each occurrence, $R^2$ can be ($C_1$-$C_5$) alkylene. At each occurrence, $R^2$ can be ethylene.

At each occurrence, $R^3$ can be selected from the group consisting of —H, a substituted or unsubstituted ($C_1$-$C_{30}$) hydrocarbyl, and a substituted or unsubstituted ($C_1$-$C_{30}$) hydrocarbylene terminated with —$NR^1_2$. At each occurrence, $R^3$ can be selected from the group consisting of —H, a substituted or unsubstituted ($C_1$-$C_{30}$)alkyl, and a substituted or unsubstituted ($C_1$-$C_{30}$)alkylene terminated with —$NR^1_2$. At each occurrence, $R^3$ can be selected from the group consisting of —H, a ($C_1$-$C_{30}$)alkyl, and a ($C_2$-$C_{10}$) alkylene terminated with —$NR^1_2$. At each occurrence, $R^3$ can be selected from the group consisting of —H, a ($C_1$-$C_{30}$)alkyl, and —$(CH_2)_2$—$NR^1_2$.

The variable m1 can be any suitable integer, such as about 0 to about 100,000, or about 1 to about 50,000, or about 0, 1, 2, 3, 4, 5, 10, 15, 20, 25, 30, 35, 40, 45, 50, 75, 100, 125, 150, 175, 200, 250, 500, 750, 1,000, 1,500, 2,000, 2,500, 5,000, 10,000, 15,000, 20,000, 25,000, 50,000, 75,000, or about 100,000 or more.

Resin.

The resin-cement composition includes a resin. The resin can be a curable resin. The resin can be at least one of a curable organic resin and a thermoset resin. As used herein, "cure" refers to allowing to undergo a physical or chemical reaction that results in hardening or an increase in viscosity. Curing can be at least one of a polymerization reaction and a crosslinking reaction. The resin can include multiple components, such as initiator or curing agent components (e.g., amines or anhydrides) and polymerizable components (e.g., epoxides). The one or more polymerizable components can form any suitable proportion of the resin, such as about 1 wt % to about 99 wt %, about 5 wt % to about 95 wt %, about 40 wt % to about 90 wt %, about 1 wt % or less, or about 2, 3, 4, 5, 6, 8, 10, 12, 14, 15, 20, 25, 30, 35, 40, 45, 50, 55, 60, 65, 70, 75, 80, 85, 90, 92, 94, 96, 97, 98, or about 99 wt % or more. The one or more initiator components of the composition can form any suitable proportion of the resin, such as about 1 wt % to about 99 wt %, about 5 wt % to about 95 wt %, about 40 wt % to about 90 wt %, about 1 wt % or less, or about 2, 3, 4, 5, 6, 8, 10, 12, 14, 15, 20, 25, 30, 35, 40, 45, 50, 55, 60, 65, 70, 75, 80, 85, 90, 92, 94, 96, 97, 98, or about 99 wt % or more. The resin can form any suitable proportion of the resin-cement composition, such as about 0.01 wt % to about 99.99 wt %, about 20 wt % to about 80 wt %, about 40 wt % to about 60 wt %, or about 0.01 wt % or less, or about 0.1 wt %, 1, 2, 3, 4, 5, 6, 7, 8, 9, 10, 15, 20, 25, 30, 35, 40, 45, 50, 55, 60, 65, 70, 75, 80, 85, 90, 91, 92, 93, 94, 95, 96, 97, 98, 99, 99.9, or about 99.99 wt % or more.

The resin can include at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol-phenol formaldehyde-furfuryl alcohol resin. In some embodiments, the resin can be at least one of bisphenol A diglycidyl ether resin, butoxymethyl butyl glycidyl ether resin, bisphenol A-epichlorohydrin resin, and bisphenol F resin. In some embodiments, the resin can be at least one of an acrylic acid polymer, an acrylic acid ester polymer, an acrylic acid homopolymer, an acrylic acid ester homopolymer, poly(methyl acrylate), poly(butyl acrylate), poly(2-ethylhexyl acrylate), an acrylic acid ester copolymer, a methacrylic acid derivative polymer, a methacrylic acid homopolymer, a methacrylic acid ester homopolymer, poly(methyl methacrylate), poly(butyl methacrylate), poly(2-ethylhexyl methacrylate), an acrylamidomethylpropane sulfonate polymer or copolymer or derivative thereof, and an acrylic acid/acrylamidomethylpropane sulfonate copolymer. In some embodiments, the resin can include at least one of a trimer acid, a fatty acid, a fatty acid-derivative, maleic anhydride, acrylic acid, a polyester, a polycarbonate, a polycarbamate, an aldehyde, formaldehyde, a dialdehyde, glutaraldehyde, a hemiacetal, an aldehyde-releasing compound, a diacid halide, a dihalide, a dichloride, a dibromide, a polyacid anhydride, citric acid, an epoxide, furfuraldehyde, an aldehyde condensate, a silyl-modified polyamide, and a condensation reaction product of a polyacid and a polyamine.

In some embodiments, the resin can include an amine-containing polymer. In some embodiments, the resin can be hydrophobically-modified. In some embodiments, the resin can include at least one of a polyamine (e.g., spermidine and spermine), a polyimine (e.g., poly(ethylene imine) and poly(propylene imine)), a polyamide, poly(2-(N,N-dimethylamino)ethyl methacrylate), poly(2-(N,N-diethylamino)ethyl methacrylate), poly(vinyl imidazole), and a copolymer including monomers of at least one of the foregoing and monomers of at least one non-amine-containing polymer such as of at least one of polyethylene, polypropylene, polyethylene oxide, polypropylene oxide, polyvinylpyridine, polyacrylic acid, polyacrylate, and polymethacrylate. The hydrophobic modification can be any suitable hydrophobic modification, such as at least one ($C_4$-$C_{30}$)hydrocarbyl including at least one of a straight chain, a branched chain, an unsaturated C—C bond, an aryl group, and any combination thereof.

In some embodiments, the resin can include a curing agent. The curing agent can be any suitable curing agent. For example, the curing agent can include at least one of an amine, an aromatic amine, an aliphatic amine, a cycloaliphatic amine, polyamines, amides, polyamides, a polyethyleneimine, piperidine, triethylamine, benzyldimethylamine, N,N-dimethylaminopyridine, 2-(N,N-dimethylaminomethyl)phenol, tris(dimethylaminomethyl) phenol, N-2-(aminoethyl)-3-aminopropyltrimethoxysilane, 3-glycidoxypropyltrimethoxysilane, n-beta-(aminoethyl)-gamma-aminopropyl trimethoxysilane, n-beta-(aminoethyl)-gamma-aminopropyl trimethoxysilane, piperazine, derivatives of piperazine (e.g., aminoethylpiperazine), pyrrole, imidazole, pyrazole, pyridine, pyrazine, pyrimidine, pyridazine, indolizine, isoindole, indole, indazole, purine, quinolizine, quinoline, isoquinoline, phthalazine, naphthyridine, quinoxaline, quinazoline, carbazole, carbazole, phenanthridine, acridine, phenathroline, phenazine, imidazolidine, phenoxazine, cinnoline, pyrrolidine, pyrroline, imidazoline, piperidine, indoline, isoindoline, quinuclindine, morpholine, azocine, azepine, 1,3,5-triazine, thiazole, pteridine, dihydroquinoline, hexamethyleneimine, indazole, 2-ethyl-4-methyl imidazole, 1,1,3-trichlorotrifluoroacetone, and combinations thereof. The curing agent can form any suitable wt % of the resin, such as about 0.001 wt % to about 50 wt %, about 0.01 wt % to about 20 wt %, or about 0.001 wt % or less, or about 0.01 wt %, 1, 2, 3, 4, 5, 10, 15, 20, 25, 30, 35, 40, 45, or about 50 wt % or more.

In various embodiments, the resin includes at least one of an epoxy-amine resin (e.g., having an epoxide component and an amine component) and an epoxy-anhydride resin (e.g., having an epoxy component and an anhydride component). For example, the resin can include at least one epoxide component that is a polyepoxide-substituted mono- or poly($C_5$-$C_{20}$)aryl compound, wherein the ($C_5$-$C_{20}$)aryl is substituted or unsubstituted, wherein the polyepoxide-substituted mono- or poly($C_5$-$C_{20}$)aryl compound is any suitable proportion of the resin, such as about 10 wt % to about 95 wt %, about 60 wt % to about 90 wt %, about 10 wt % or less, or about 15, 20, 25, 30, 35, 40, 45, 50, 55, 60, 65, 70, 75, 80, 85, 90, or about 95 wt % or more. Herein, an epoxide-substituted or amine-substituted organic group wherein the organic group is substituted or unsubstituted can have the epoxide or amine substituted on any one of the substituents of the organic group or substituted directly on the organic group itself. The epoxide component can be a diepoxide-substituted phenyl($C_1$-$C_{10}$)hydrocarbylphenyl, wherein the phenyl and ($C_1$-$C_{10}$)hydrocarbyl are each independently substituted or unsubstituted. The epoxide component can be a diglycidyl ether of bisphenol A (2-[[4-[2-[4-(oxiran-2-ylmethoxy)phenyl]propan-2-yl]phenoxy]methyl] oxirane).

The resin can include at least one epoxide component that is an epoxide-substituted ($C_1$-$C_{10}$)hydrocarbyl, wherein the ($C_1$-$C_{10}$)hydrocarbyl can be independently substituted or unsubstituted, wherein the epoxide-substituted ($C_1$-$C_{10}$)hydrocarbyl is any suitable proportion of the resin, such as about 5 wt % to about 60 wt %, 10 wt % to about 30 wt %, or about 5 wt % or less, or about 10 wt %, 15, 20, 25, 30, 35, 40, 45, 50, 55, or about 60 wt % or more. In some embodiments, the epoxide component can be a ($C_1$-$C_{10}$) hydrocarbylglycidyl ether, such as butyl glycidyl ether. In various embodiments, the resin includes a combination an epoxide-substituted ($C_1$-$C_{10}$)hydrocarbyl compound and a polyepoxide-substituted mono- or poly($C_5$-$C_{20}$)aryl compound, such as a combination of butyl glycidyl ether and a diglycidyl ether of bisphenol A, such as about 50 wt % to about 90 wt % of the resin, or about 70 wt % to about 80 wt % of the resin, or about 50 wt % or less, or about 55 wt %, 60, 65, 70, 75, 80, 85, or about 90 wt % or more.

The resin can include at least one epoxide component that is a polyepoxide-substituted ($C_5$-$C_{20}$)cycloalkyl compound, wherein the ($C_5$-$C_{20}$)cycloalkyl is substituted or unsubstituted, wherein the polyepoxide-substituted ($C_5$-$C_{20}$)cycloalkyl compound is any suitable proportion of the resin, such as about 5 wt % to about 60 wt %, about 10 wt % to about 30 wt %, or about 5 wt % or less, or about 10 wt %, 15, 20, 25, 30, 35, 40, 45, 50, 55, or about 60 wt % or more. The epoxide component can be cyclohexanedimethanol diglycidyl ether.

The resin can include at least one amine component that is a polyamine-substituted ($C_1$-$C_{30}$)hydrocarbyl, wherein the ($C_1$-$C_{30}$)hydrocarbyl and each amine are independently substituted or unsubstituted, in any suitable proportion of the composition, such as about 5 wt % to about 50 wt %, about 10 wt % to about 30 wt %, about 5 wt % or less, or about 10 wt %, 15, 20, 25, 30, 35, 40, 45, or about 50 wt % or more. The amine component can be a bis(amino($C_0$-$C_5$) hydrocarbyl)($C_6$-$C_{20}$)aryl compound, wherein the ($C_6$-$C_{20}$) aryl, ($C_0$-$C_5$)hydrocarbyl, and each amine are each independently substituted or unsubstituted, wherein the resin can include any suitable amount of the bis(amino($C_0$-$C_5$)hydrocarbyl)($C_6$-$C_{20}$)aryl compound, such as about 5 wt % to about 50 wt %, about 10 wt % to about 30 wt %, or about 5 wt % or less, or about 10 wt %, 15, 20, 25, 30, 35, 40, 45, or about 50 wt % or more. The amine component can be diethyltoluenediamine. The resin can include at least one amine component that is a polyamine-substituted poly(($C_2$-$C_5$)hydrocarbyloxy), wherein each ($C_2$-$C_5$)hydrocarbyloxy and each amine are independently substituted or unsubstituted. The amine component can be polyoxypropylene diamine. The resin can include an amine component that is a mono- or polyamino($C_0$-$C_{10}$)hydrocarbyl($C_6$-$C_{20}$)aryl compound, wherein the ($C_0$-$C_{10}$)hydrocarbyl, ($C_6$-$C_{20}$)aryl, and each amine are each independently substituted or unsubstituted, wherein the resin can include any suitable amount of the mono- or polyamino($C_0$-$C_{10}$)hydrocarbyl($C_6$-$C_{20}$)aryl compound, such as about 0.1 wt % to about 10 wt %, about 1 wt % to about 5 wt %, or about 0.1 wt % or less, or about 1 wt %, 2, 3, 4, 5, 6, 7, 8, 9, or about 10 wt % or more. The amine component can be a tris(amino($C_1$-$C_3$)hydrocarbyl) benzene, wherein the ($C_1$-$C_3$)hydrocarbyl, the benzene, and each amine are independently substituted or unsubstituted. The amine component can be 2,4,6-tris(dimethylaminomethyl)phenol.

Cement.

The resin-cement composite composition includes at least one cement. The resin-cement composite composition can include one cement, or multiple cements. The cement can form any suitable proportion of the resin-cement composite, such as about 0.01 wt % to about 99.99 wt % of the resin-cement composite composition, about 20 wt % to about 80 wt %, about 40 wt % to about 60 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 91, 92, 93, 94, 95, 96, 97, 98, 99, 99.9, or about 99.99 wt % or more.

The cement can be any suitable cement. For example, the cement can be at least one of Portland cement, pozzolana cement, gypsum cement, high alumina content cement, slag cement, silica cement, or a combination thereof. The cement can include any suitable additive, in any suitable proportion, such as at least one of fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, and a thixotropic additive. The additive can be present in the cement at about 0.001 wt % to about 30 wt %, or about 0.01 wt % to about 10 wt %, or about 0.001 wt % or less, or about 0.01 wt %, 0.1, 1, 2, 3, 4, 5, 6, 7, 8, 9, 10, 15, 20, 25, or about 30 wt % or more.

Other Components.

The resin-cement composite composition or a mixture including the resin-cement composite composition can include any suitable additional component in any suitable proportion, such that the resin-cement composite composition, or mixture including the same, can be used as described herein.

In some embodiments, the resin-cement composite composition includes one or more viscosifiers. The viscosifier can be any suitable viscosifier. The viscosifier can affect the viscosity of the resin-cement composite composition or a solvent that contacts the resin-cement composite composition at any suitable time and location. In some embodiments, the viscosifier provides an increased viscosity at least one of before injection into the subterranean formation, at the time of injection into the subterranean formation, during travel through a tubular disposed in a borehole, once the resin-cement composite composition reaches a particular subterranean location, or some period of time after the resin-cement composite composition reaches a particular subterranean location. In some embodiments, the viscosifier can be about 0.000.1 wt % to about 10 wt % of the resin-cement composite composition or a mixture including the same, about 0.004 wt % to about 0.01 wt %, or about 0.000.1 wt % or less, 0.000.5 wt %, 0.001, 0.005, 0.01, 0.05, 0.1, 0.5, 1, 2, 3, 4, 5, 6, 7, 8, 9, or about 10 wt % or more of the resin-cement composite composition or a mixture including the same.

The viscosifier can include at least one of a substituted or unsubstituted polysaccharide, and a substituted or unsubstituted polyalkene (e.g., a polyethylene, wherein the ethylene unit is substituted or unsubstituted, derived from the corresponding substituted or unsubstituted ethene), wherein the polysaccharide or polyalkene is crosslinked or uncrosslinked. The viscosifier can include a polymer including at least one repeating unit derived from a monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and a poly(($C_2$-$C_{10}$)alkene), wherein the ($C_2$-$C_{10}$) alkene is substituted or unsubstituted. The viscosifier can include at least one of poly(acrylic acid) or ($C_1$-$C_5$)alkyl esters thereof, poly(methacrylic acid) or ($C_1$-$C_5$)alkyl esters thereof, poly(vinyl acetate), poly(vinyl alcohol), poly(ethylene glycol), poly(vinyl pyrrolidone), polyacrylamide, poly(hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, diutan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethylpentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly(vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol)

homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the resin-cement composite composition can include one or more crosslinkers. The crosslinker can be any suitable crosslinker. In some examples, the crosslinker can be incorporated in a cross-linked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a $(C_1$-$C_{30})$hydrocarbylboronic acid, a $(C_1$-$C_{30})$hydrocarbyl ester of a $(C_1$-$C_{30})$hydrocarbylboronic acid, a $(C_1$-$C_{30})$hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a $(C_1$-$C_{20})$alkylenebiacrylamide (e.g., methylenebisacrylamide), a poly$((C_1$-$C_{20})$alkenyl)-substituted mono- or poly-$(C_1$-$C_{20})$alkyl ether (e.g., pentaerythritol allyl ether), and a poly$(C_2$-$C_{20})$ alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000.01 wt % to about 5 wt % of the resin-cement composite composition or a mixture including the same, about 0.001 wt % to about 0.01 wt %, or about 0.000.01 wt % or less, or about 0.000.05 wt %, 0.000.1, 0.000.5, 0.001, 0.005, 0.01, 0.05, 0.1, 0.5, 1, 2, 3, 4, or about 5 wt % or more.

In some embodiments, the resin-cement composite composition can include one or more breakers. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release of the breaker, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a persulfate, percarbonate, perborate, peroxide, perphosphosphate, permanganate, chlorite, or hyporchlorite ion. An enzymatic breaker can be at least one of an alpha or beta amylase, amyloglucosidase, oligoglucosidase, invertase, maltase, cellulase, hemicellulase, and mannanohydrolase. The breaker can be about 0.001 wt % to about 30 wt % of the resin-cement composite composition or a mixture including the same, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The resin-cement composite composition, or a mixture including the resin-cement composite composition, can include any suitable fluid. For example, the fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of the resin-cement composite composition, or a mixture including the same, or about 0.001 wt % or less, or 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The resin-cement composite composition or a mixture including the same can include any suitable downhole fluid. The resin-cement composite composition can be combined with any suitable downhole fluid before, during, or after the placement of the resin-cement composite composition in the subterranean formation or the contacting of the composition and the subterranean material. In some examples, the resin-cement composite is combined with a downhole fluid above the surface, and then the combined composition is placed in a subterranean formation or contacted with a subterranean material. In another example, the resin-cement composite composition is injected into a subterranean formation to combine with a downhole fluid, and the combined composition is contacted with a subterranean material or is considered to be placed in the subterranean formation. The placement of the resin-cement composite composition in the subterranean formation can include contacting the subterranean material and the mixture. Any suitable weight percent of the resin-cement composite composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the resin-cement composite composition or mixture including the same.

In some embodiments, the resin-cement composite composition, or a mixture including the same, can include any suitable amount of any suitable material used in a downhole fluid. For example, the resin-cement composite composition or a mixture including the same can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts (e.g., any suitable salt, such as potassium salts such as potassium chloride, potassium bromide, potassium formate; calcium salts such as calcium chloride, calcium bromide, calcium formate; cesium salts such as cesium chloride, cesium bromide, cesium formate, or a combination thereof), fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, lime, or a combination thereof. In various embodiments, the resin-cement composite composition or a mixture including the same can include one or more additive components such as: COLDTROL®, ATC®, OMC 2™, and OMC 42™ thinner additives; RHEMOD™ viscosifier and suspension agent; TEMPERUS™ and VIS-PLUS® additives for providing temporary increased viscosity; TAU-MOD™ viscosifying/suspension agent; ADAPTA®, DURATONE® HT, THERMO TONE™, BDF™-366, and BDF™-454 filtration control agents; LIQUITONE™ polymeric filtration agent and viscosifier; FACTANT™ emulsion stabilizer; LE SUPERMUL™, EZ MUL® NT, and FORTI-MUL® emulsifiers; DRIL TREAT® oil wetting agent for heavy fluids; BARACARB® bridging agent; BAROID® weighting agent; BAROLIFT® hole sweeping agent; SWEEP-WATE® sweep weighting agent; BDF-508 rheology modifier; and GELTONE® II organophilic clay. In various embodiments, the resin-cement composite composition or a mixture including the same can include one or more additive components such as: X-TEND® II, PAC™-R, PAC™-L, LIQUI-VIS® EP, BRINEDRIL-VIS™, BARA-ZAN®, N-VIS®, and AQUAGEL® viscosifiers; THERMA-CHEK®, N-DRIL™ N-DRIL™ HT PLUS, IMPERMEX®, FILTERCHEK™, DEXTRID®, CARBONOX®, and BARANEX® filtration control agents; PERFORMATROL®, GEM™, EZ-MUD®, CLAY GRABBER®, CLAYSEAL®, CRYSTAL-DRIL®, and CLAY SYNC™ II shale stabilizers; NXS-LUBE™, EP MUD-LUBE®, and DRIL-N-SLIDE™ lubricants; QUIK-THIN®, IRON-THIN™, and ENVIRO-THIN™ thinners; SOURSCAV™ scavenger; BARACOR® corrosion inhibitor; and WALL-NUT®, SWEEP-WATE®, STOPPIT™, PLUG-GIT®, BARACARB®, DUO-SQUEEZE®, BAROFIBRE™, STEELSEAL®, and HYDRO-PLUG® lost circulation management materials. Any suitable proportion of the resin-cement composite composition or mixture including the resin-cement composite composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the resin-cement composite composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill bit as well as reduce friction between the drill string and the sides of the hole. The drilling fluid aids in support of the drill pipe and drill bit, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the resin-cement composite composition or a mixture including the same in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

In various embodiments, the resin-cement composite composition or mixture including the same can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ polytetrafluoroethylene), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The resin-cement composite composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

System or Apparatus.

In various embodiments, the present invention provides a system. The system can be any suitable system that can use or that can be generated by use of an embodiment of the resin-cement composite composition described herein in a subterranean formation, or that can perform or be generated by performance of a method for using the resin-cement composite composition described herein. The system can include a composition including a resin, a cement, and a substituted or unsubstituted poly(alkylamine) compatibilizer. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the resin-cement composite composition described herein to a subterranean location and for using the composition therein, such as for a cementing operation, a repair operation, a consolidation operation, or a fracturing operation. In various embodiments, the system or apparatus can include a pump fluidly coupled to a tubular (e.g., any suitable type of oilfield pipe, such as pipeline, drill pipe, production tubing, and the like), with the tubular containing a resin-cement composite composition including the resin, cement, and substituted or unsubstituted poly (alkylamine) compatibilizer described herein.

In some embodiments, the system can include a drill string disposed in a wellbore, with the drill string including a drill bit at a downhole end of the drill string. The system can also include an annulus between the drill string and the wellbore. The system can also include a pump configured to circulate the resin-cement composite composition through the drill string, through the drill bit, and back above-surface through the annulus. In some embodiments, the system can include a fluid processing unit configured to process the resin-cement composite composition exiting the annulus to generate a cleaned drilling fluid for recirculation through the wellbore.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the resin-cement composite composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the resin-cement composite composition to the high pressure pump. In such embodiments, the low pressure pump can "step up" the pressure of the resin-cement composite composition before it reaches the high pressure pump.

In some embodiments, the systems or apparatuses described herein can further include a mixing tank that is upstream of the pump and in which the resin-cement composite composition is formulated. In various embodiments, the pump (e.g., a low pressure pump, a high pressure pump, or a combination thereof) can convey the resin-cement composite composition from the mixing tank or other source of the resin-cement composite composition to the tubular. In other embodiments, however, the resin-cement composite composition can be formulated offsite and transported to a worksite, in which case the resin-cement composite composition can be introduced to the tubular via the pump directly from its shipping container (e.g., a truck, a railcar, a barge, or the like) or from a transport pipeline. In either case, the resin-cement composite composition can be drawn into the pump, elevated to an appropriate pressure, and then introduced into the tubular for delivery to the subterranean formation.

FIG. 1 shows an illustrative schematic of systems and apparatuses that can deliver embodiments of the resin-cement composite compositions of the present invention to a subterranean location, according to one or more embodiments. It should be noted that while FIG. 1 generally depicts a land-based system or apparatus, it is to be recognized that like systems and apparatuses can be operated in subsea locations as well. Embodiments of the present invention can have a different scale than that depicted in FIG. 1. As depicted in FIG. 1, system or apparatus 1 can include mixing tank 10, in which an embodiment of the resin-cement composite composition can be formulated. The resin-cement composite composition can be conveyed via line 12 to wellhead 14, where the resin-cement composite composition enters tubular 16, with tubular 16 extending from wellhead 14 into subterranean formation 18. Upon being ejected from tubular 16, the resin-cement composite composition can subsequently penetrate into subterranean formation 18. Pump 20 can be configured to raise the pressure of the resin-cement composite composition to a desired degree before its introduction into tubular 16. It is to be recognized that system or apparatus 1 is merely exemplary in nature and various additional components can be present that have not necessarily been depicted in FIG. 1 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 1, at least part of the resin-cement composite composition can, in some embodiments, flow back to wellhead 14 and exit subterranean formation 18. In some embodiments, the resin-cement composite composition that has flowed back to wellhead 14 can subsequently be recovered, and in some examples reformulated, and recirculated to subterranean formation 18.

It is also to be recognized that the disclosed resin-cement composite composition can also directly or indirectly affect the various downhole or subterranean equipment and tools that can come into contact with the resin-cement composite composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 1.

Composition for Treatment of a Subterranean Formation.

Various embodiments provide a resin-cement composite composition for treatment of a subterranean formation. The resin-cement composite composition can be any suitable resin-cement composite composition that can be used to perform an embodiment of the method for treatment of a subterranean formation described herein. For example, the resin-cement composite composition can include a resin, a cement, and a substituted or unsubstituted poly(alkylamine) compatibilizer. In some embodiments, the resin-cement composite composition can include about 20 wt % to about 80 wt % of a curable epoxide resin, about 20 wt % to about 80 wt % of a cement, and about 1 wt % to about 15 wt % of a polyethyleneimine compatibilizer. Various embodiments provide a cured product of a resin-cement composite composition described herein.

In some embodiments, the composition further includes a downhole fluid. The downhole fluid can be any suitable downhole fluid. In some embodiments, the downhole fluid is a cement fluid or a fracturing fluid.

Method for Preparing a Composition for Treatment of a Subterranean Formation.

In various embodiments, the present invention provides a method for preparing a resin-cement composite composition for treatment of a subterranean formation. The method can be any suitable method that produces a resin-cement composite composition described herein. For example, the method can include forming a composition including a resin, a cement, and a substituted or unsubstituted poly(alkylamine) compatibilizer.

EXAMPLES

Various embodiments of the present invention can be better understood by reference to the following Examples which are offered by way of illustration. The present invention is not limited to the Examples given herein.

Example 1. Preparation of Samples

A 33% active (i.e., 33% (w/w) polyethyleneimine in water) hyperbranched polyethyleneimine was added to a standard cement blend of 14 pounds per gallon (ppg). The polyethyleneimine was added as an aqueous solution by weight of cement (BWOC) to the cement mixture and water content was adjusted accordingly based on a 33% activity (e.g., to provide 33 wt % solids and 67 wt % water in the final blend). Throughout these Examples, a blend that is indicated as including a particular 10 wt % or 30 wt % of PEI solution includes 10 wt % or 30 wt % of the aqueous 33% active PEI solution.

TABLE 1

Sample composition.

| | Cement | Cement + 10 wt % PEI solution | Cement + 30 wt % PEI solution |
|---|---|---|---|
| LaFarge Class H | 396.02 g | 392.68 g | 386.15 g |
| Diutan gum | 0.79 g | 0.78 g | 0.77 g |
| PEI solution | 0 g | 39.26 g | 115.85 g |
| Fresh Water | 274.39 g | 238.48 g | 168.43 g |

Example 2. Settling and Rheological Viability of Samples

Each of the samples from Example 1 was mixed and tested individually for settling and rheological viability. Each of the formulations showed minimal settling when poured into cylinders and cut into sections for measurement of density in accordance with Archimedes' Principle (e.g., the upward buoyant force that is exerted on a body immersed in a fluid, whether fully or partially submerged, is equal to the weight of the fluid that the body displaces). To measure the density using Archimedes' Principle, the cylinder was cut into disks from the top, middle, and bottom. The disks are then measured to determined their weight and also suspended in water to measure the volume change via displacement. All formulations showed positive viability for mixing at room temperature except for the Cement+30% PEI solution blend which read 300+cP at 200 rpm using the FANN® yield stress adapter (FYSA) attachment.

Example 3. Preparation of Resin+Cement Samples

After initial testing, each blend was mixed with resin in equal parts by volume, using a standard resin blend of 9 pounds per gallon (ppg) with the resin composition indicated in Table 2. C1 is diglycidyl ether of bisphenol A (60 wt % to 90 wt %) and butyl glycidyl ether (10 wt % to 30 wt %). C2 is diethyltoluenediamine. C3 is 2,4,6-tris(dimethylaminomethyl)phenol.

TABLE 2

Resin composition.

| Resin | |
|---|---|
| R1 | 400 g |
| H1 | 108 g |
| A2 | 12 g |

Each cement-resin composite was tested for rheological viability. All mixtures tested showed positive rheological results including the resin+30% PEI solution in cement mixture. Addition of the resin to cement in all cases caused a decrease in the overall rheological properties of each mixture.

Example 4. Preparation of Cured Samples

The cement-resin composites of Example 3 were then poured into cylinders and allowed to cure for 48 hours. After curing, the composites were tested for stability (e.g., cut into sections for measurement of density in accordance with Archimedes' Principle, as described in Example 2), tensile strength, and compressive strength. None of the samples showed evidence of settling as each density showed ≤0.5 ppg of settling across each sample (e.g., the top, middle, and bottom disks cut from the cylinder had approximately the same density). The overall density of the composite mixtures was around 12 ppg.

Example 5. Testing of Tensile Strength of Cured Samples

Figure 2:
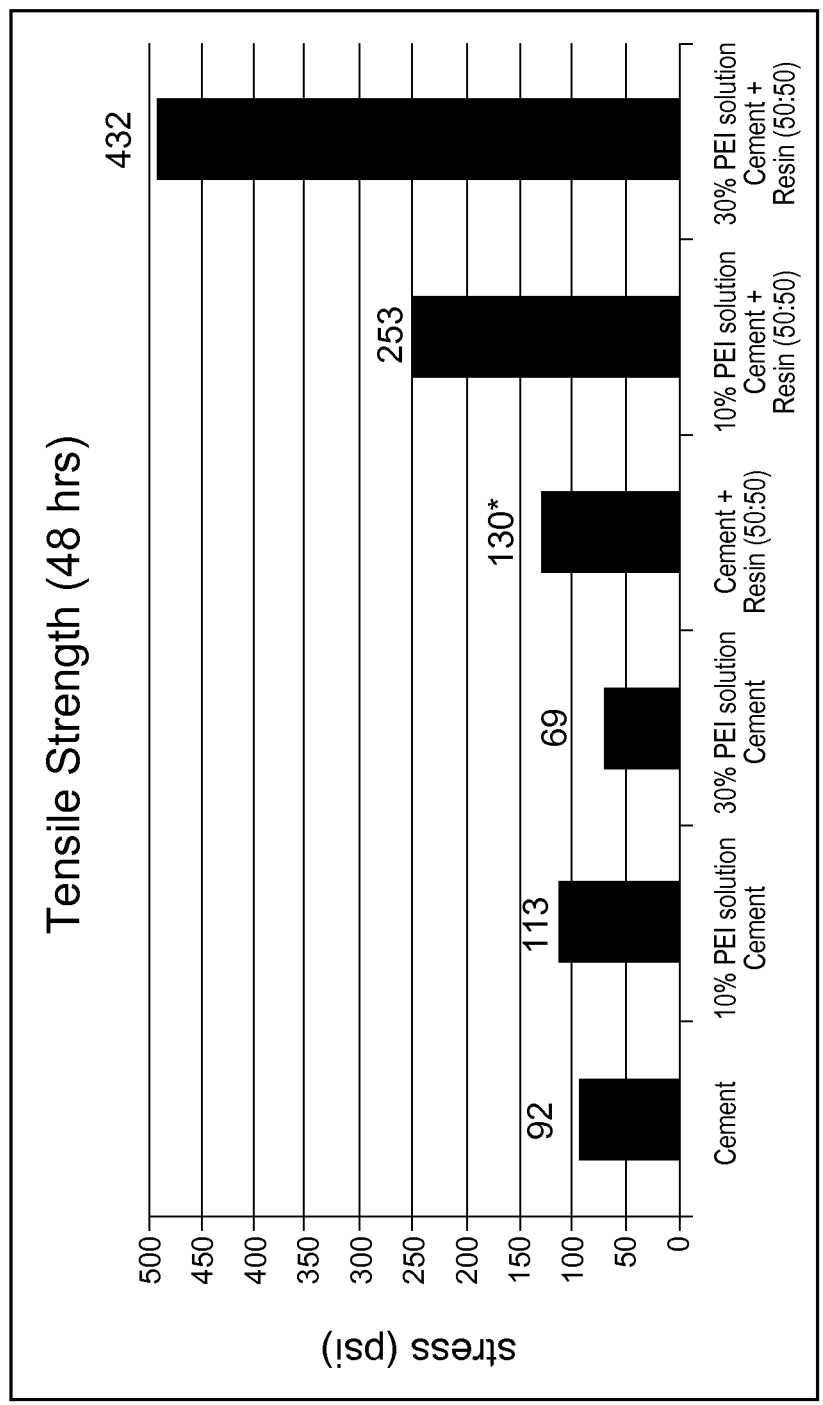
FIG. 2 illustrates tensile strength of various cured cement samples, in accordance with various embodiments.

Tensile strengths of the cured samples from Example 4 were measured, with results illustrated in FIG. 2. It was observed that the addition of the PEI to cement caused minor changes in strength depending on the percent added. As part of a composite mixture, increase of the concentration of PEI caused a direct increase in the tensile strength measure almost doubling with each increase in concentration (10% and 30%) over a blend of cement and resin. Nonuniformity was present in the 50:50 cement+resin blend, but the edges were suitable for Brazilian tensile testing. Brazilian tensile testing was performed in accordance with ASTM D3967-08, by taking a 2" diameter by 4" length cylinder and cutting it into four separate 1"-length samples. The samples were turned on their side and placed between the platens of a servohydraulic load frame suitable for evaluation of mechanical properties and crushed at a load rate of 0.0001 inch/second.

Example 6. Testing of Compressive Strength of Cured Samples

Figure 3:
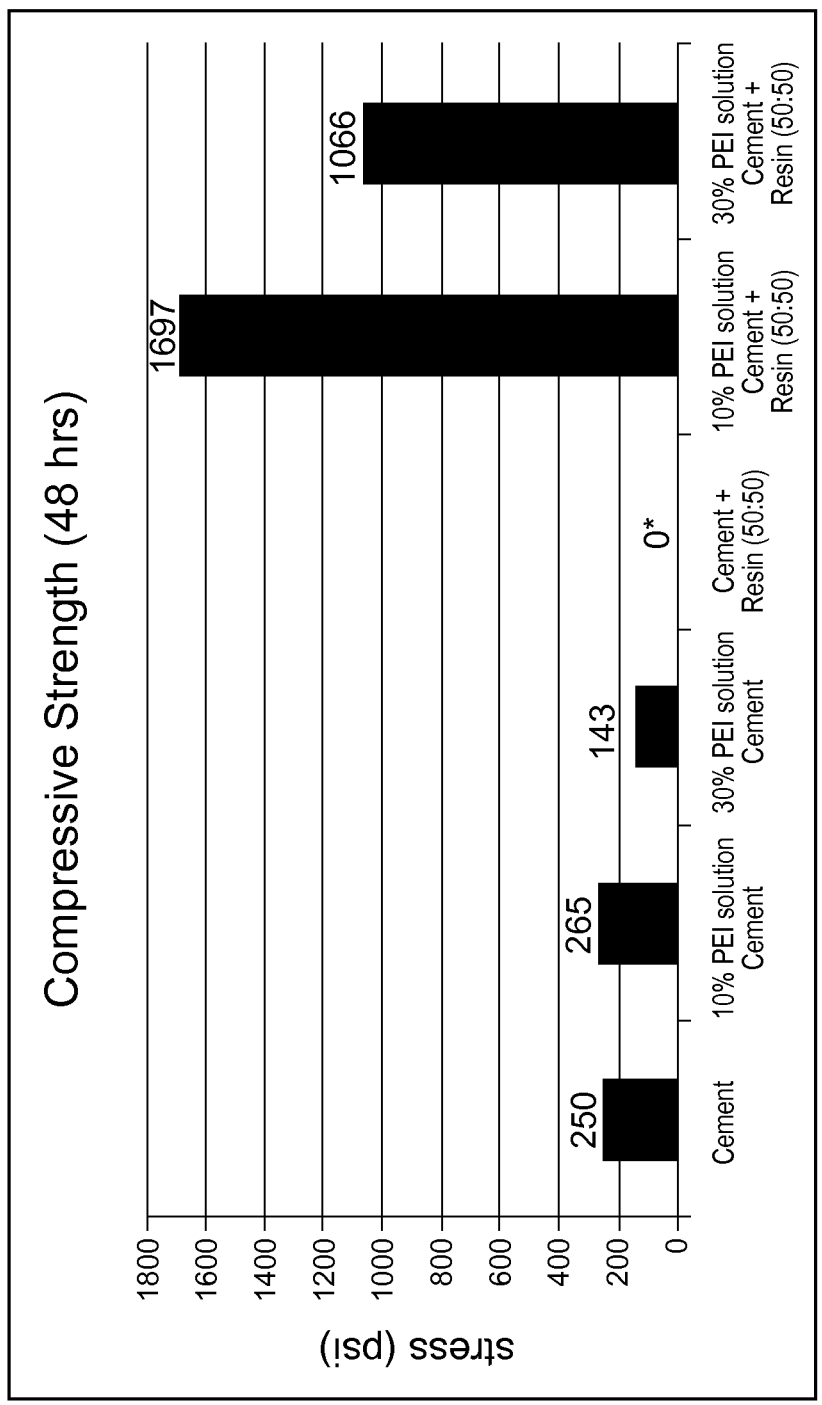
FIG. 3 illustrates the compressive strength of various cured cement samples, in accordance with various embodiments.

Compressive strengths of the cured samples from Example 4 were measured at 48 hours after curing, with results illustrated in FIG. 3. In normal cement blends, concentration of PEI caused minor changes in compressive strengths. When added into composites, however, increase in the concentration of PEI caused a decrease in compressive strength measurements. The cement+resin (50:50) composite was not tested because it did not mix well and was not possible to properly prepare for mechanical properties testing; both nonuniformity of the composite mixture and inability to effectively surface the sample edges rendered samples from this mixture not suitable for testing due to the possibility of significant point loading affecting compressive strength values.

Figure 4C:
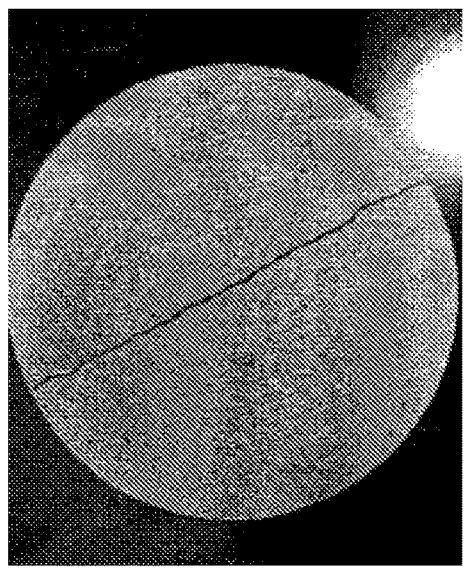
FIG. 4C is a photograph of a cross-section of a cured sample of a 30% PEI solution in cement+resin (50:50) blend, in accordance with various embodiments.
Figure 4B:
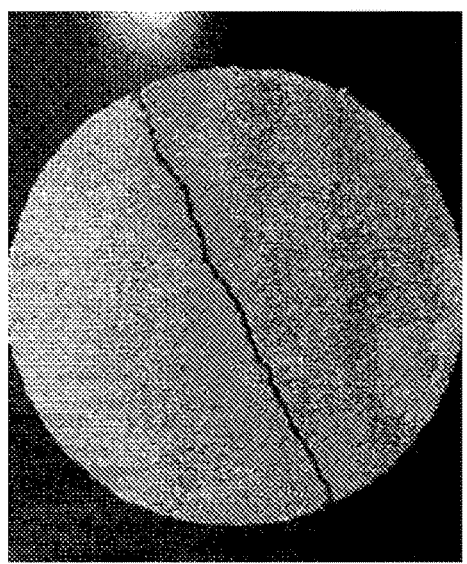
FIG. 4B is a photograph of a cross-section of a cured sample of a 10% PEI solution in cement+resin (50:50) blend, in accordance with various embodiments.
Figure 4A:
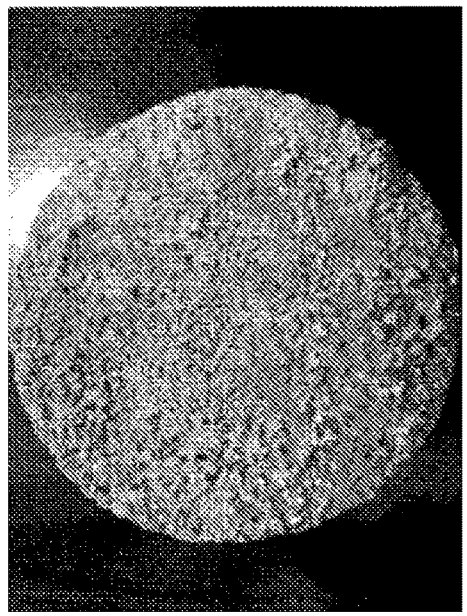
FIG. 4A is a photograph of a cross-section of a cured sample of a cement+resin (50:50) blend, in accordance with various embodiments.

The nonuniformity described in the cement+resin (50:50) sample for compressive strength was noticeable in all mixtures of this specific composite. As PEI was increased in concentration, uniformity of the samples became more pronounced, as illustrated by photographs of cross-sections of the cured samples from Example 4 shown in FIGS. 4A-C. The increase in uniformity is visible as a decrease of apparent graininess.

Figure 5:
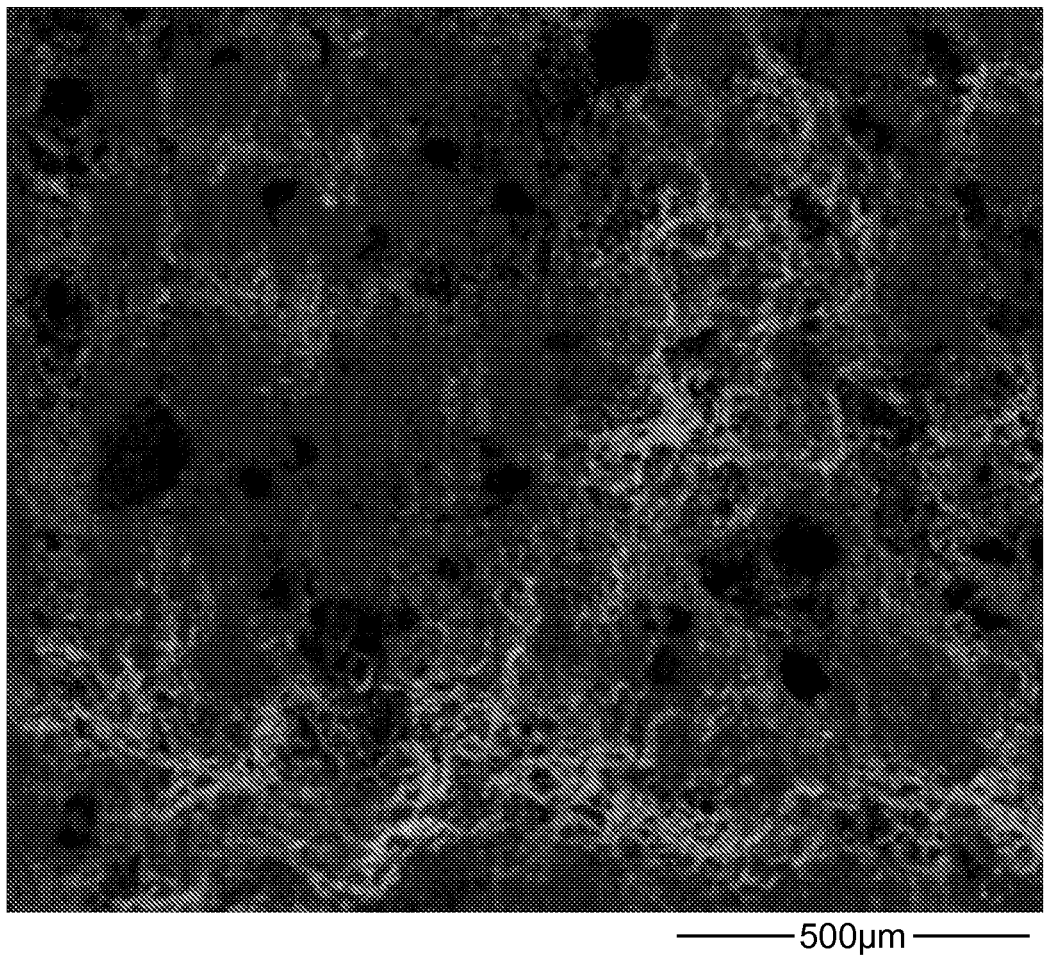
FIG. 5 illustrates a scanning electron microscope image of a cured sample of 30% PEI solution in cement+resin (50:50) blend, in accordance with various embodiments.

Uniformity of composites based on an increase in PEI concentration was also evident at the microscopic level. A scanning electron microscope image at 500 μm magnification of a cross-section of the cured sample of 30% PEI solution in cement+resin (50:50) blend from Example 4 is shown in FIG. 5, clearly showing an increase of resin dispersal at 30% PEI solution concentration.

Example 7. Evaluation of Strength Development Over Time

To evaluate strength development over time, a blend of the 30% PEI solution in cement and the 30% PEI solution in cement+resin (50:50) composite from Example 3 were mixed and cured for 7 days. After the 7 day curing period, cement cylinders were prepared and crushed in order to obtain compressive strengths, with results illustrated in FIG.

Figure 6:
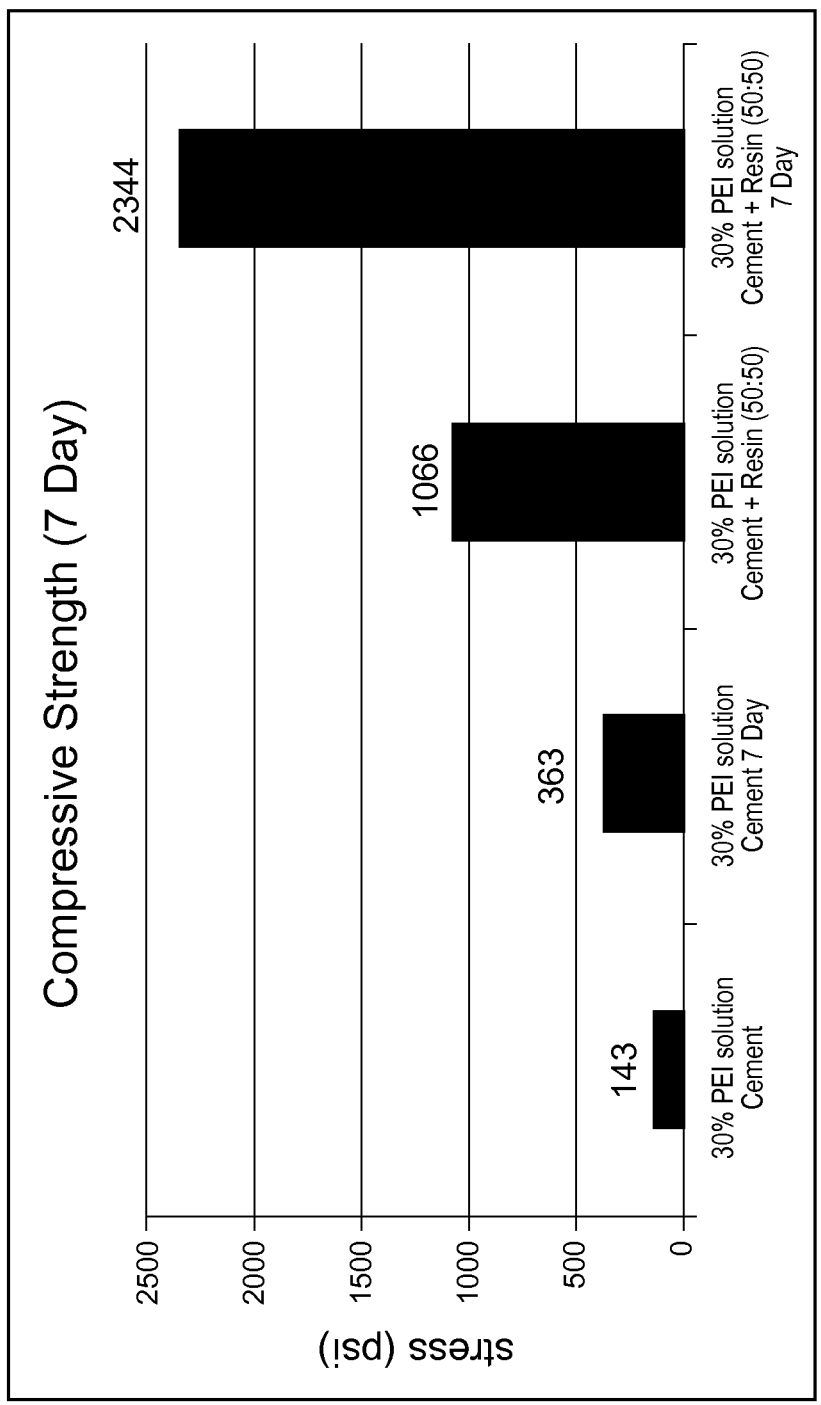
FIG. 6 illustrates compressive strength of various cured cement compositions, in accordance with various embodiments.

6. FIG. 6 contrasts the compressive strengths of the 7 day cured samples with the 48 hour cured samples from Example 4. Significant increases in strength were realized for both the neat and composite mixtures. Specifically, for the 30% composite mixture, an increase of roughly 1300 psi of compressive strength was observed.

Figure 7B:
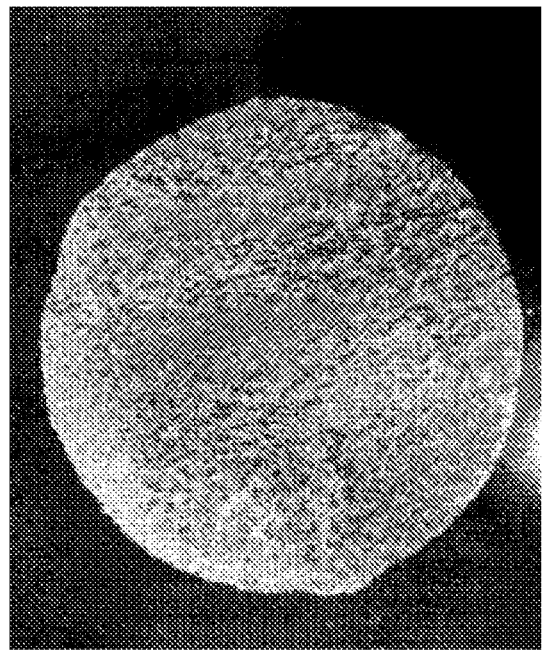
FIG. 7B is a photograph of a cross-section of a cured sample of cement+resin (50:50).
Figure 7A:
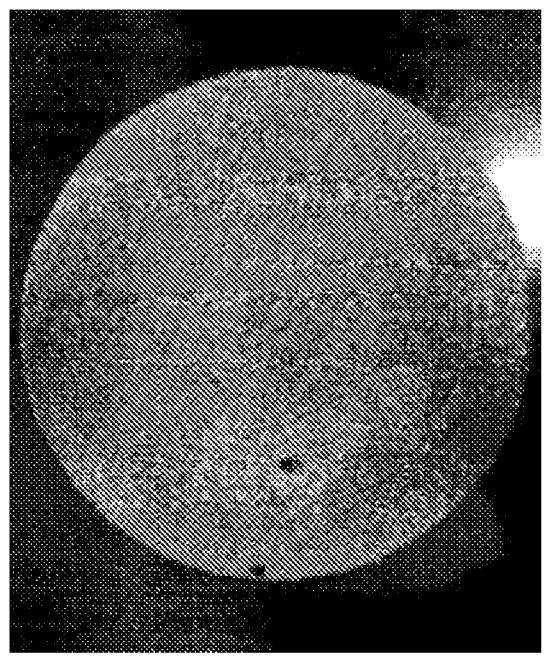
FIG. 7A is a photograph of a cross-section of a cured sample of 30% PEI solution in cement+resin (50:50).

For comparison, two samples (a blend of the 30% PEI solution in cement and the 30% PEI solution in cement+ resin (50:50) composite) were mixed and cured for 24 hours at 150° F. to observe how the mixtures behave at elevated temperatures, with photographs of cross-sections of the cured samples shown in FIGS. 7A-B. Even at elevated temperatures, it was observed that PEI successfully compatibilized the mixture of cement and resin.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments

The following exemplary embodiments are provided, the numbering of which is not to be construed as designating levels of importance:

Embodiment 1 provides a method of treating a subterranean formation, the method comprising:
placing in a subterranean formation a resin-cement composite composition comprising
a resin;
a cement; and
a substituted or unsubstituted poly(alkylamine) compatibilizer.

Embodiment 2 provides the method of Embodiment 1, further comprising mixing the resin, the cement, and the poly(alkylamine) compatibilizer together to form the resin-cement composite composition.

Embodiment 3 provides the method of Embodiment 2, wherein the mixing occurs at least partially above-surface.

Embodiment 4 provides the method of any one of Embodiments 2-3, wherein the mixing occurs at least partially in the subterranean formation.

Embodiment 5 provides the method of any one of Embodiments 1-4, wherein the method comprises at least one of cementing and repairing a wellbore in the subterranean formation.

Embodiment 6 provides the method of any one of Embodiments 1-5, wherein the method comprises consolidating the subterranean formation.

Embodiment 7 provides the method of any one of Embodiments 1-6, wherein the method comprises fracturing the subterranean formation.

Embodiment 8 provides the method of any one of Embodiments 1-7, further comprising curing the resin-cement composite, to provide a cured product of the resin-cement composite.

Embodiment 9 provides the method of Embodiment 8, wherein the curing occurs at least partially before the placing of the resin-cement composite composition in the subterranean formation.

Embodiment 10 provides the method of any one of Embodiments 8-9, wherein the curing occurs at least partially in the subterranean formation.

Embodiment 11 provides the method of any one of Embodiments 8-10, wherein the cured product has a tensile strength of about 115 psi to about 10,000 psi.

Embodiment 12 provides the method of any one of Embodiments 8-11, wherein the cured product has a tensile strength of about 200 psi to about 800 psi.

Embodiment 13 provides the method of any one of Embodiments 8-12, wherein the cured product has a compressive strength of about 300 psi to about 10,000 psi.

Embodiment 14 provides the method of any one of Embodiments 8-13, wherein the cured product has a compressive strength of about 1,000 psi to about 3,000 psi.

Embodiment 15 provides the method of any one of Embodiments 1-14, wherein the resin-cement composite composition is sufficient to be a stable homogenous mixture without mixing or agitation for at least 1 day.

Embodiment 16 provides the method of any one of Embodiments 1-15, wherein about 0.1 wt % to about 30 wt % of the resin-cement composite composition is the poly(alkylamine) compatibilizer.

Embodiment 17 provides the method of any one of Embodiments 1-16, wherein about 1 wt % to about 15 wt % of the resin-cement composite composition is the poly(alkylamine) compatibilizer.

Embodiment 18 provides the method of any one of Embodiments 1-17, wherein the poly(alkylamine) has the following structure:

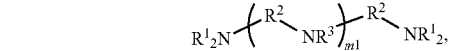

wherein:
at each occurrence, $R^1$ is selected from the group consisting of —H and a substituted or unsubstituted $(C_1$-$C_{30})$ hydrocarbyl,
at each occurrence, $R^2$ is a substituted or unsubstituted $(C_1$-$C_{30})$hydrocarbylene,
at each occurrence, $R^3$ is selected from the group consisting of —H, a substituted or unsubstituted $(C_1$-$C_{30})$hydrocarbyl, and a substituted or unsubstituted $(C_1$-$C_{30})$hydrocarbylene terminated with —$NR^1_2$, and
m1 is about 0 to about 100,000.

Embodiment 19 provides the method of Embodiment 18, wherein at each occurrence, $R^1$ is selected from the group consisting of —H and a substituted or unsubstituted $(C_1$-$C_{30})$alkyl.

Embodiment 20 provides the method of any one of Embodiments 18-19, wherein at each occurrence, $R^1$ is selected from the group consisting of —H and a $(C_1$-$C_{30})$ alkyl.

Embodiment 21 provides the method of any one of Embodiments 18-20, wherein at each occurrence, $R^2$ is $(C_1$-$C_{20})$alkylene.

Embodiment 22 provides the method of any one of Embodiments 18-21, wherein at each occurrence, $R^2$ is $(C_1$-$C_5)$alkylene.

Embodiment 23 provides the method of any one of Embodiments 18-22, wherein at each occurrence, $R^2$ is ethylene.

Embodiment 24 provides the method of any one of Embodiments 18-23, wherein at each occurrence, $R^3$ is selected from the group consisting of —H, a substituted or unsubstituted $(C_1-C_{30})$alkyl, and a substituted or unsubstituted $(C_1-C_{30})$alkylene terminated with —$NR^1_2$.

Embodiment 25 provides the method of any one of Embodiments 18-24, wherein at each occurrence, $R^3$ is selected from the group consisting of —H, a $(C_1-C_{30})$alkyl, and a $(C_2-C_{10})$alkylene terminated with —$NR^1_2$.

Embodiment 26 provides the method of any one of Embodiments 18-25, wherein at each occurrence, $R^3$ is selected from the group consisting of —H, a $(C_1-C_{30})$alkyl, and —$(CH_2)_2$—$NR^1_2$.

Embodiment 27 provides the method of any one of Embodiments 18-26, wherein m1 is about 1 to about 50,000.

Embodiment 28 provides the method of any one of Embodiments 18-27, wherein the poly(alkylamine) is polyethyleneimine.

Embodiment 29 provides the method of any one of Embodiments 18-28, wherein the poly(alkylamine) is hydrophobically- or hydrophilically-modified polyethyleneimine.

Embodiment 30 provides the method of any one of Embodiments 1-29, wherein about 0.01 wt % to about 99.99 wt % of the resin-cement composite composition is the resin.

Embodiment 31 provides the method of any one of Embodiments 1-30, wherein about 20 wt % to about 80 wt % of the resin-cement composite composition is the resin.

Embodiment 32 provides the method of any one of Embodiments 1-31, wherein the resin comprises at least one of a shellac, a polyamide, a silyl-modified polyamide, a polyester, a polycarbonate, a polycarbamate, a urethane, a natural resin, an epoxy-based resin, a furan-based resin, a phenolic-based resin, a urea-aldehyde resin, and a phenol-phenol formaldehyde-furfuryl alcohol resin.

Embodiment 33 provides the method of any one of Embodiments 1-32, wherein the resin comprises at least one of an epoxy-amine and an epoxy-anhydride resin.

Embodiment 34 provides the method of any one of Embodiments 1-33, wherein the resin comprises at least one epoxide component that is a polyepoxide-substituted mono- or poly$(C_5-C_{20})$aryl compound, wherein the $(C_5-C_{20})$aryl is substituted or unsubstituted.

Embodiment 35 provides the method of Embodiment 34, wherein the epoxide component is a diepoxide-substituted phenyl$(C_1-C_{10})$hydrocarbylphenyl, wherein the phenyl and $(C_1-C_{10})$hydrocarbyl are each independently substituted or unsubstituted.

Embodiment 36 provides the method of any one of Embodiments 34-35, wherein the epoxide component is diglycidyl ether of bisphenol A.

Embodiment 37 provides the method of any one of Embodiments 1-36, wherein wherein the resin comprises at least one epoxide component that is an epoxide-substituted $(C_1-C_{10})$hydrocarbyl, wherein the $(C_1-C_{10})$hydrocarbyl can be independently substituted or unsubstituted.

Embodiment 38 provides the method of Embodiment 37, wherein the epoxide component is butyl glycidyl ether.

Embodiment 39 provides the method of any one of Embodiments 1-38, wherein the resin comprises at least one epoxide component that is a polyepoxide-substituted $(C_5-C_{20})$cycloalkyl compound, wherein the $(C_5-C_{20})$cycloalkyl is substituted or unsubstituted.

Embodiment 40 provides the method of Embodiment 39, wherein the epoxide component is cyclohexanedimethanol diglycidyl ether.

Embodiment 41 provides the method of any one of Embodiments 1-40, wherein the resin comprises at least one amine component that is a polyamine-substituted $(C_1-C_{30})$ hydrocarbyl, wherein the $(C_1-C_{30})$hydrocarbyl and each amine are independently substituted or unsubstituted.

Embodiment 42 provides the method of Embodiment 41, wherein the amine component is a bis(amino$(C_0-C_5)$hydrocarbyl)$(C_6-C_{20})$aryl compound, wherein the $(C_6-C_{20})$aryl, $(C_0-C_5)$hydrocarbyl, and each amine are each independently substituted or unsubstituted.

Embodiment 43 provides the method of any one of Embodiments 41-42, wherein the amine component is diethyltoluenediamine.

Embodiment 44 provides the method of any one of Embodiments 1-43, wherein the resin comprises at least one amine component that is a polyamine-substituted poly($(C_2-C_5)$hydrocarbyloxy), wherein each $(C_2-C_5)$hydrocarbyloxy and each amine are independently substituted or unsubstituted.

Embodiment 45 provides the method of Embodiment 44, wherein the amine component is polyoxypropylene diamine.

Embodiment 46 provides the method of any one of Embodiments 1-45, wherein the resin comprises an amine component that is a mono- or polyamino$(C_0-C_{10})$hydrocarbyl$(C_6-C_{20})$aryl, wherein the $(C_0-C_{10})$hydrocarbyl, $(C_6-C_{20})$ aryl, and each amine are each independently substituted or unsubstituted.

Embodiment 47 provides the method of Embodiment 46, wherein the amine component is a tris(amino$(C_1-C_3)$hydrocarbyl)benzene, wherein the $(C_1-C_3)$hydrocarbyl, the benzene, and each amine are independently substituted or unsubstituted.

Embodiment 48 provides the method of any one of Embodiments 46-47, wherein the amine component is 2,4,6-tris(dimethylaminomethyl)phenol.

Embodiment 49 provides the method of any one of Embodiments 1-48, wherein about 0.01 wt % to about 99.99 wt % of the resin-cement composite composition is the cement.

Embodiment 50 provides the method of any one of Embodiments 1-49, wherein about 20 wt % to about 80 wt % of the resin-cement composite composition is the cement.

Embodiment 51 provides the method of any one of Embodiments 1-50, wherein the cement comprises at least one of Portland cement, pozzolana cement, gypsum cement, high alumina content cement, slag cement, silica cement, or a combination thereof.

Embodiment 52 provides the method of any one of Embodiments 1-51, wherein the cement comprises at least one of fly ash, metakaolin, shale, zeolite, a set retarding additive, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, and a thixotropic additive.

Embodiment 53 provides the method of any one of Embodiments 1-52, wherein the resin-cement composite composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 54 provides the method of any one of Embodiments 1-53, wherein the placing of the resin-cement composite composition in the subterranean formation comprises pumping the resin-cement composite composition through a tubular disposed in a wellbore and into the subterranean formation.

Embodiment 55 provides the method of any one of Embodiments 1-54, wherein the placing of the curable composition in the subterranean formation comprises pumping the curable composition through a casing disposed in a wellbore and into an annulus between the casing and the wellbore.

Embodiment 56 provides a system for performing the method of any one of Embodiments 1-55, the system comprising:
a tubular disposed in the subterranean formation; and
a pump configured to pump the resin-cement composite composition in the subterranean formation through the tubular.

Embodiment 57 provides the cured product of any one of Embodiments 8-14.

Embodiment 58 provides a method of treating a subterranean formation, the method comprising:
placing in a subterranean formation a resin-cement composite composition comprising about 20 wt % to about 80 wt % of a curable epoxide resin;
about 20 wt % to about 80 wt % of a cement; and
about 1 wt % to about 15 wt % of a polyethyleneimine compatibilizer.

Embodiment 59 provides a system comprising:
a resin-cement composite composition comprising
a resin;
a cement; and
a substituted or unsubstituted poly(alkylamine) compatibilizer; and
a subterranean formation comprising the composition therein.

Embodiment 60 provides the system of Embodiment 59, further comprising
a tubular disposed in the subterranean formation; and
a pump configured to pump the composition in the subterranean formation through the tubular.

Embodiment 61 provides a resin-cement composite composition for treatment of a subterranean formation, the composition comprising:
a resin;
a cement; and
a substituted or unsubstituted poly(alkylamine) compatibilizer.

Embodiment 62 provides a cured product of the composition of Embodiment 61.

Embodiment 63 provides a resin-cement composite composition for treatment of a subterranean formation, the composition comprising:
about 20 wt % to about 80 wt % of a curable epoxide resin;
about 20 wt % to about 80 wt % of a cement; and
about 1 wt % to about 15 wt % of a polyethyleneimine compatibilizer.

Embodiment 64 provides a cured product of the composition of Embodiment 63.

Embodiment 65 provides a method of preparing a composition for treatment of a subterranean formation, the method comprising:
forming a resin-cement composite composition comprising
a resin;
a cement; and
a substituted or unsubstituted poly(alkylamine) compatibilizer.

Embodiment 66 provides the composition, method, or system of any one or any combination of Embodiments 1-65 optionally configured such that all elements or options recited are available to use or select from.

What is claimed is:

1. A method of treating a subterranean formation, comprising:
placing a resin-cement composite composition into a subterranean formation, wherein the resin-cement composite composition comprises:
a resin;
a cement; and
a substituted or unsubstituted poly(alkylamine) compatibilizer having the following structure:

wherein:
at each occurrence, $R^1$ is selected from the group consisting of —H and a substituted or unsubstituted $(C_1-C_{30})$hydrocarbyl,
at each occurrence, $R^2$ is a substituted or unsubstituted $(C_1-C_{30})$hydrocarbylene,
at each occurrence, $R^3$ is selected from the group consisting of —H, a substituted or unsubstituted $(C_1-C_{30})$hydrocarbyl, and a substituted or unsubstituted $(C_1-C_{30})$hydrocarbylene terminated with —$NR^1_2$, and
m1 is 3 to about 50,000.

2. The method of claim 1, further comprising curing the resin-cement composite, to provide a cured product of the resin-cement composite, wherein the cured product has a tensile strength of about 200 psi to about 800 psi and a compressive strength of about 1,000 psi to about 3,000 psi.

3. The method of claim 1, wherein the poly(alkylamine) compatibilizer comprises about 1 wt % to about 15 wt % of the resin-cement composite composition.

4. The method of claim 1, wherein at each occurrence, $R^1$ is selected from the group consisting of —H and a $(C_1-C_{30})$ alkyl, and wherein at each occurrence, $R^2$ is $(C_1-C_5)$alkylene.

5. The method of claim 4, wherein at each occurrence, $R^3$ is selected from the group consisting of —H, a $(C_1-C_{30})$ alkyl, and —$(CH_2)_2$—$NR^1_2$.

6. The method of claim 1, wherein the poly(alkkylamine) compatibilizer is hydrophobically- or hydrophilically-modified polyethyleneimine.

7. The method of claim 1, wherein about 20 wt % to about 80 wt % of the resin-cement composite composition is the resin.

8. The method of claim 1, wherein the resin comprises at least one of an epoxy-amine and an epoxy-anhydride resin.

9. The method of claim 1, wherein the resin comprises an epoxide component, wherein the epoxide component is a diepoxide-substituted phenyl($C_1$-$C_{10}$)hydrocarbylphenyl, and wherein the phenyl and ($C_1$-$C_{10}$)hydrocarbyl are each independently substituted or unsubstituted.

10. The method of claim 1, wherein the resin comprises an epoxide component, wherein the resin comprises at least one epoxide component that is an epoxide-substituted ($C_1$-$C_{10}$)hydrocarbyl, and wherein the ($C_1$-$C_{10}$)hydrocarbyl can be independently substituted or unsubstituted.

11. The method of claim 1, wherein the resin comprises an epoxide component, wherein the resin comprises at least one epoxide component that is a polyepoxide-substituted ($C_5$-$C_{20}$)cycloalkyl compound, and wherein the ($C_5$-$C_{20}$)cycloalkyl is substituted or unsubstituted.

12. The method of claim 1, wherein the resin comprises an epoxide component, wherein the epoxide component comprises diglycidyl ether of bisphenol A, butyl glycidyl ether, cyclohexanedimethanol diglycidyl ether, or any combination thereof.

13. The method of claim 1, wherein the resin comprises an amine component, wherein the amine component comprises a bis(amino($C_0$-$C_5$)hydrocarbyl)($C_6$-$C_{20}$)aryl compound, and wherein the ($C_6$-$C_{20}$)aryl, ($C_0$-$C_5$)hydrocarbyl, and each amine is independently substituted or unsubstituted.

14. The method of claim 1, wherein the resin comprises an amine component, wherein the resin comprises at least one amine component that is a polyamine-substituted poly((($C_2$-$C_5$)hydrocarbyloxy), and wherein each ($C_2$-$C_5$)hydrocarbyloxy and each amine are independently substituted or unsubstituted.

15. The method of claim 1, wherein the resin comprises an amine component, wherein the amine component comprises a tris(amino($C_1$-$C_3$)hydrocarbyl)benzene, and wherein the ($C_1$-$C_3$)hydrocarbyl, the benzene, and each amine is independently substituted or unsubstituted.

16. The method of claim 1, wherein the resin comprises an amine component, and wherein the amine component comprises diethyltoluenediamine, polyoxypropylene diamine, 2,4,6-tris(dimethylaminomethyl)phenol, or any combination thereof.

17. A system for performing the method of claim 1, the system comprising:
a tubular disposed in the subterranean formation; and
a pump configured to pump the resin-cement composite composition in the subterranean formation through the tubular.

* * * * *